US012626425B2

(12) United States Patent
Chen et al.

(10) Patent No.: US 12,626,425 B2
(45) Date of Patent: May 12, 2026

(54) WAFER IMAGE EQUALIZATION METHOD AND APPARATUS

(71) Applicant: United Semiconductor (Xiamen) Co., Ltd., Xiamen (CN)

(72) Inventors: Qiao Lin Chen, Shamen City (CN); Ching-Shu Lo, Singapore (SG); Yan Cai, Singapore (SG); Tsung Che Lin, Singapore (SG); Wen Yi Tan, Xiamen (CN)

(73) Assignee: United Semiconductor (Xiamen) Co., Ltd., Xiamen (CN)

(*) Notice: Subject to any disclaimer, the term of this patent is extended or adjusted under 35 U.S.C. 154(b) by 673 days.

(21) Appl. No.: 18/108,021

(22) Filed: Feb. 10, 2023

(65) Prior Publication Data

US 2024/0221241 A1 Jul. 4, 2024

(30) Foreign Application Priority Data

Dec. 28, 2022 (CN) .......................... 202211715331.4

(51) Int. Cl.
| | |
|---|---|
| *G06T 11/00* | (2026.01) |
| *G06T 7/00* | (2017.01) |
| *G06T 11/10* | (2026.01) |

(52) U.S. Cl.
CPC ............ *G06T 11/10* (2026.01); *G06T 7/0004* (2013.01); *G06T 2207/10024* (2013.01); *G06T 2207/30148* (2013.01); *G06T 2210/32* (2013.01)

(58) Field of Classification Search
CPC ................. G06T 11/001; G06T 7/0004; G06T 2207/10024; G06T 2207/30148; G06T 2210/32; G06T 2207/20076
See application file for complete search history.

(56) References Cited

U.S. PATENT DOCUMENTS

| | | | | |
|---|---|---|---|---|
| 5,923,383 A | * | 7/1999 | Kim .......................... | G06T 5/40 348/E5.073 |
| 6,259,472 B1 | * | 7/2001 | Park .......................... | G06T 5/40 382/172 |
| 2007/0076943 A1 | * | 4/2007 | Wienecke ............. | G06T 7/0004 382/145 |
| 2010/0189339 A1 | * | 7/2010 | Amanullah ........ | G01N 21/9501 382/145 |
| 2016/0275671 A1 | * | 9/2016 | Li ........................... | G06T 7/001 |

* cited by examiner

*Primary Examiner* — Oneal R Mistry
*Assistant Examiner* — Jongbong Nah
(74) *Attorney, Agent, or Firm* — Winston Hsu

(57) ABSTRACT

A method for wafer image equalization includes obtaining a wafer image, converting the wafer image into bitmap data, generating a grayscale distribution of RGB pixels according to the bitmap data, generating a grayscale cumulative probability distribution of the RGB pixels according to the grayscale distribution, generating a mapping function according to the grayscale cumulative probability distribution of the RGB pixels, converting the grayscale distribution of the RGB pixels by the mapping function into an equalized grayscale distribution of the RGB pixels, and generating an equalized wafer image according to the equalized grayscale distribution of the RGB pixels.

10 Claims, 8 Drawing Sheets
(6 of 8 Drawing Sheet(s) Filed in Color)

30

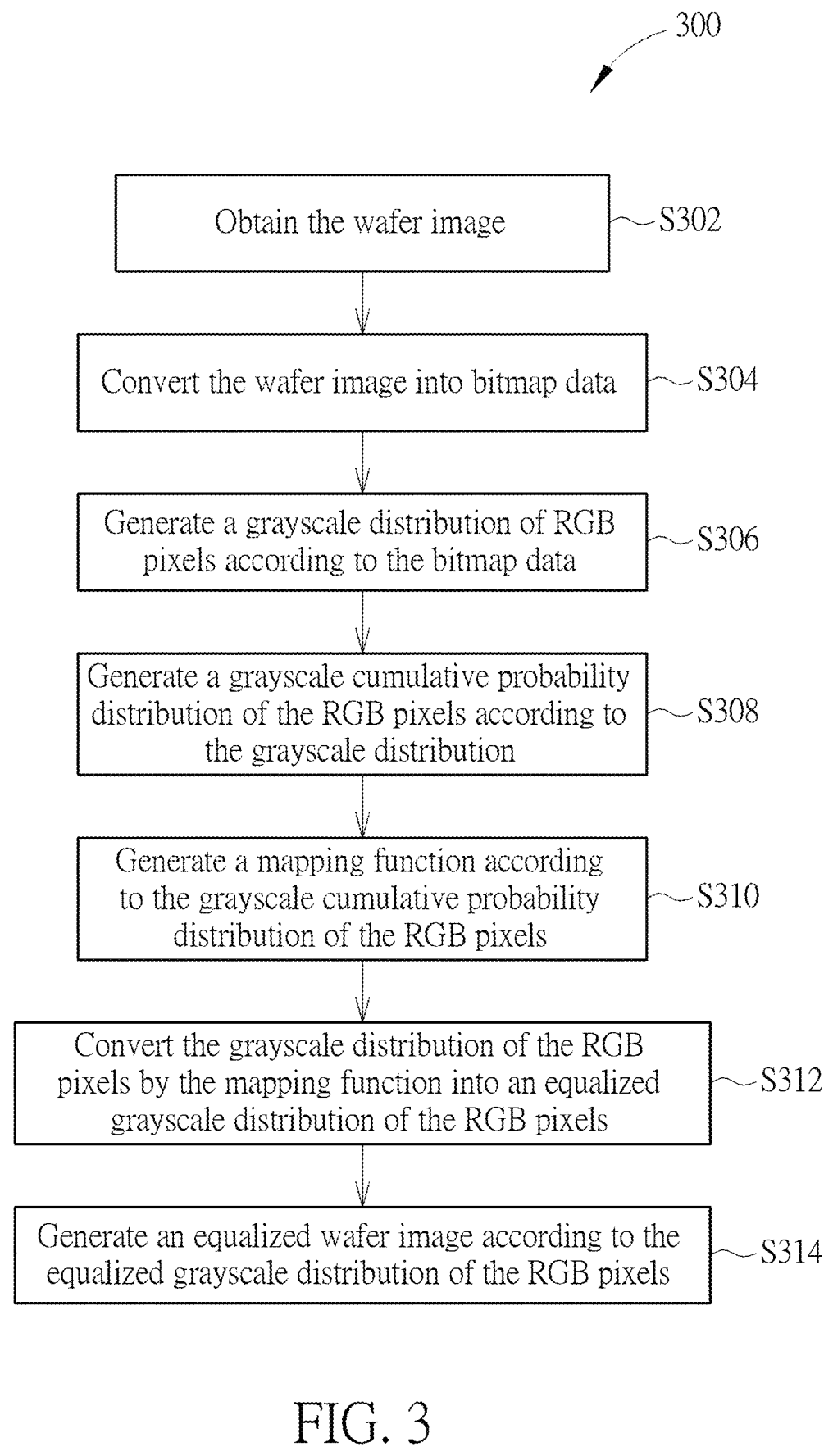

300

Obtain the wafer image — S302

Convert the wafer image into bitmap data — S304

Generate a grayscale distribution of RGB pixels according to the bitmap data — S306

Generate a grayscale cumulative probability distribution of the RGB pixels according to the grayscale distribution — S308

Generate a mapping function according to the grayscale cumulative probability distribution of the RGB pixels — S310

Convert the grayscale distribution of the RGB pixels by the mapping function into an equalized grayscale distribution of the RGB pixels — S312

Generate an equalized wafer image according to the equalized grayscale distribution of the RGB pixels — S314

FIG. 3

WAFER IMAGE EQUALIZATION METHOD AND APPARATUS

BACKGROUND OF THE INVENTION

1. Field of the Invention

The present invention is related to wafer image processing, and more particular to a wafer image equalization method and apparatus.

2. Description of the Prior Art

A wafer intelligence scanner is an essential part of the wafer inspection. The machine integrates optical and visual technology with multi-angle illumination sources to obtain images of wafer with its defects. The wafer intelligence scanner can be widely used in the detection of various wafer defects such as crack, scratches, discoloring, feature loss, shift, deformation and foreign particle, etc. However, wafer engineers often need to manually inspect wafer images obtained by wafer scanners to confirm wafer status. With typical wafer image color distributions, image features of wafer defects often blend into the background. When this happens, wafer engineers may miss some wafer defects and waste a lot of time manually finding wafer defects. However, wafer images can be converted to digital data and optimized by image processing techniques. Therefore, image processing methods are helpful to engineers for them to quickly find wafer defects.

SUMMARY OF THE INVENTION

An embodiment provides a method for wafer image equalization. The method includes obtaining a wafer image, converting the wafer image into bitmap data, generating a grayscale distribution of RGB pixels according to the bitmap data, generating a grayscale cumulative probability distribution of the RGB pixels according to the grayscale distribution, generating a mapping function according to the grayscale cumulative probability distribution of the RGB pixels, converting the grayscale distribution of the RGB pixels by the mapping function into an equalized grayscale distribution of the RGB pixels, and generating an equalized wafer image according to the equalized grayscale distribution of the RGB pixels.

An embodiment provides a wafer image equalization apparatus. The apparatus includes a wafer intelligent scanner for capturing a raw wafer image, and a processor coupled to the wafer intelligent scanner. The processor is used to decode the raw wafer image to generate the wafer image, convert the wafer image into bitmap data, generate a grayscale distribution of RGB pixels according to the bitmap data, generate a grayscale cumulative probability distribution of the RGB pixels according to the grayscale distribution, generate a mapping function according to the grayscale cumulative probability distribution of the RGB pixels, convert the grayscale distribution of the RGB pixels by the mapping function into an equalized grayscale distribution of the RGB pixels, and generate an equalized wafer image according to the equalized grayscale distribution of the RGB pixels.

These and other objectives of the present invention will no doubt become obvious to those of ordinary skill in the art after reading the following detailed description of the preferred embodiment that is illustrated in the various figures and drawings.

BRIEF DESCRIPTION OF THE DRAWINGS

The patent or application file contains at least one drawing executed in color. Copies of this patent or patent application publication with color drawing (s) will be provided by the Office upon request and payment of the necessary fee.

FIG. 3 is a flowchart of an image equalization method for the image of the wafer of FIG. 2.

DETAILED DESCRIPTION

Figure 1:
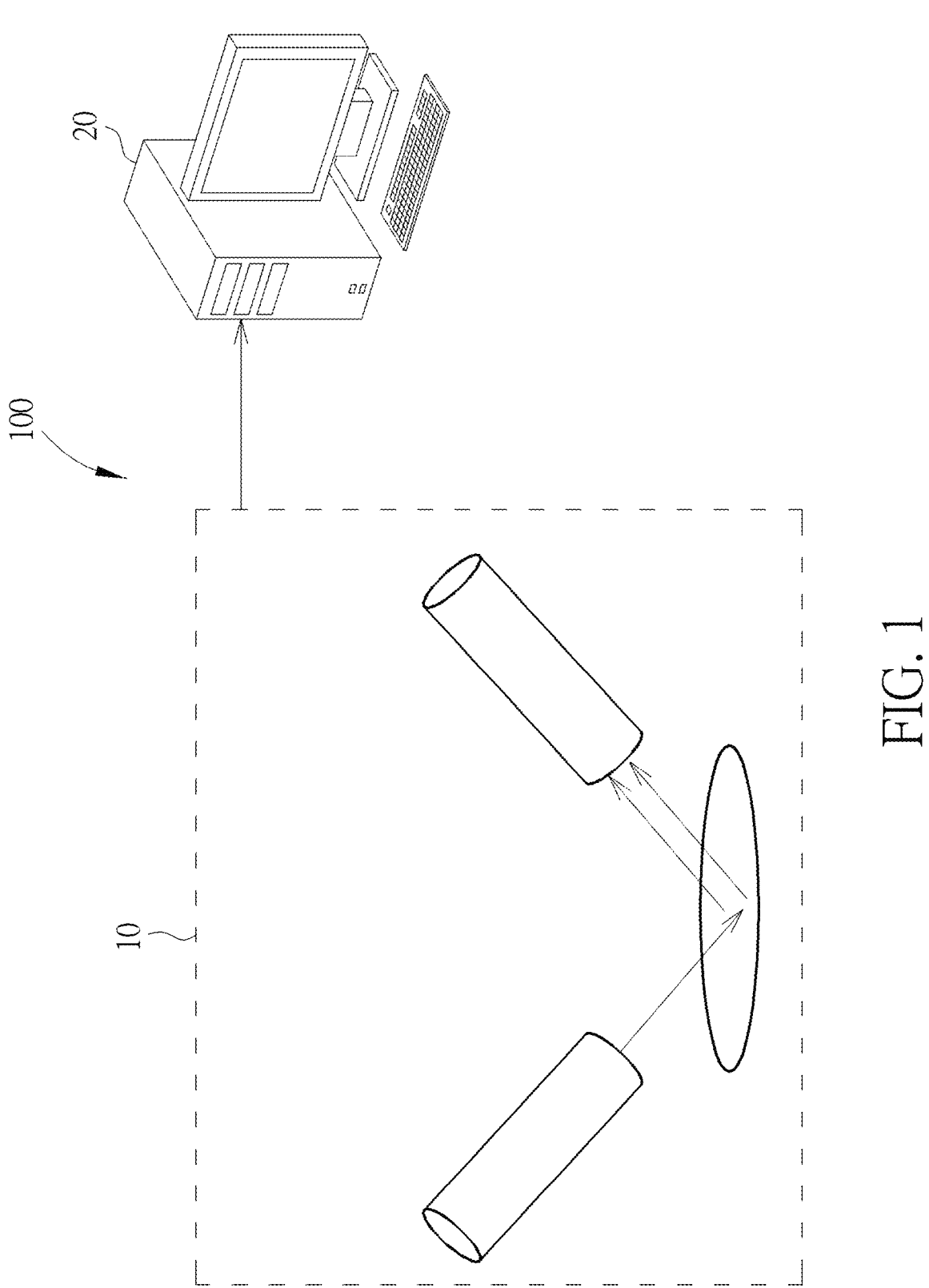
FIG. 1 is a diagram of a wafer image equalization apparatus of an embodiment.

FIG. 1 is a diagram of a wafer image equalization apparatus 100 of an embodiment. The wafer image equalization apparatus 100 includes a wafer intelligent scanner 10 and a processor 20 coupled to the wafer intelligent scanner 10. The wafer intelligent scanner 10 is a machine that integrates optical and visual technologies, and obtains wafer images with multi-angle light sources. The wafer intelligent scanner 10 can detect physical defects and pattern defects on wafers and obtain the position coordinates. Defects can be divided into random defects and systematic defects. Random defects are mainly caused by particles that become attached to a wafer surface, so their positions cannot be predicted. Systematic defects are caused by the conditions of the mask and exposure process, and will occur in the same position on the circuit pattern of all the dies projected. They occur in locations where the exposure conditions are very difficult and require fine adjustment. Major manufacturers like KLA-Tencor, Hitachi, and Tokyo Electron Ltd. all produce wafer intelligent scanner and related machines. The processor 20 is for processing and optimizing the captured wafer images to improve inspection throughput. The processor 20 can be any form of processing device, such as a central processing unit (CPU), a graphics processing unit (GPU), a microprocessor, a logic operation unit, or a programmable chip, etc.

Figure 2:
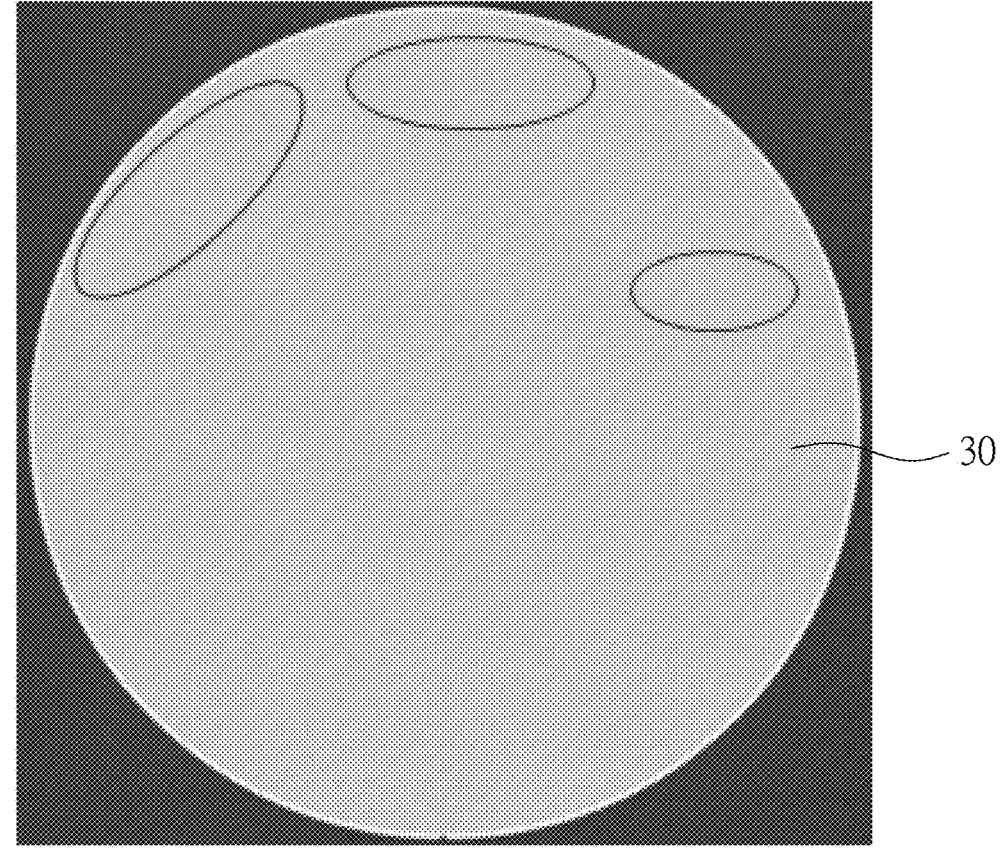
FIG. 2 is an image of a wafer obtained by the wafer intelligent scanner.

FIG. 2 is an image of the wafer 30 obtained by the wafer intelligent scanner 10. The original wafer image obtained by the wafer intelligent scanner 10 is in a special format and needs to be decoded to generate the image of the wafer 30 in FIG. 2. The image of wafer 30 may include image height and width information for subsequent image processing. The circled portion in FIG. 2 is a defect of the wafer 30. However, as shown in FIG. 2, typical wafer defects are easily mixed into the background and are not easy to be detected by human eyes. Also, complex defects are likely to cause over kill or under kill during the inspection process. Therefore, the embodiment provides image the following equalization method to help engineers quickly detect wafer defects.

FIG. 3 is a flowchart of an image equalization method 300 for the image of the wafer 30. The image equalization method 300 for the image of the wafer 30 is applied to the wafer image equalization apparatus 100. The image equalization method 300 includes the following steps:

S302: Obtain the wafer image;

S304: Convert the wafer image into bitmap data;

S306: Generate a grayscale distribution of RGB pixels according to the bitmap data;

S308: Generate a grayscale cumulative probability distribution of the RGB pixels according to the grayscale distribution;

S310: Generate a mapping function according to the grayscale cumulative probability distribution of the RGB pixels;

S312: Convert the grayscale distribution of the RGB pixels by the mapping function into an equalized grayscale distribution of the RGB pixels; and S314: Generate an equalized wafer image according to the equalized grayscale distribution of the RGB pixels.

The image of the wafer 30 can be obtained by the wafer intelligent scanner 10. The processor 20 can perform the rest of the image processing steps. These steps are described in detail below.

After the wafer intelligent scanner 10 obtains the image of the wafer 30 in step S302, the processor 20 can convert the image of the wafer 30 into bitmap data in step S304. The bitmap data includes the position and color of each pixel. The color information of each pixel is represented by RGB parameter with grayscale. The bitmap can be 1, 4, 8, 16, 24 and 32 bits, etc., according to the bit depth. The higher the bit depth of an image, the more colors it can store. It means more realistic color performance with larger amount of data. For example, an image with bitmap of bit depth of 1 has only two possible values (black and white), so it is also called a binary bitmap. An image with bit depth of 8 has 28 (i.e., 256) possible grayscale values. The 8-bit RGB image in the embodiment is composed of three color bits (i.e., red, green, and blue), and each color bit has 256 possible grayscale values.

Figure 4:
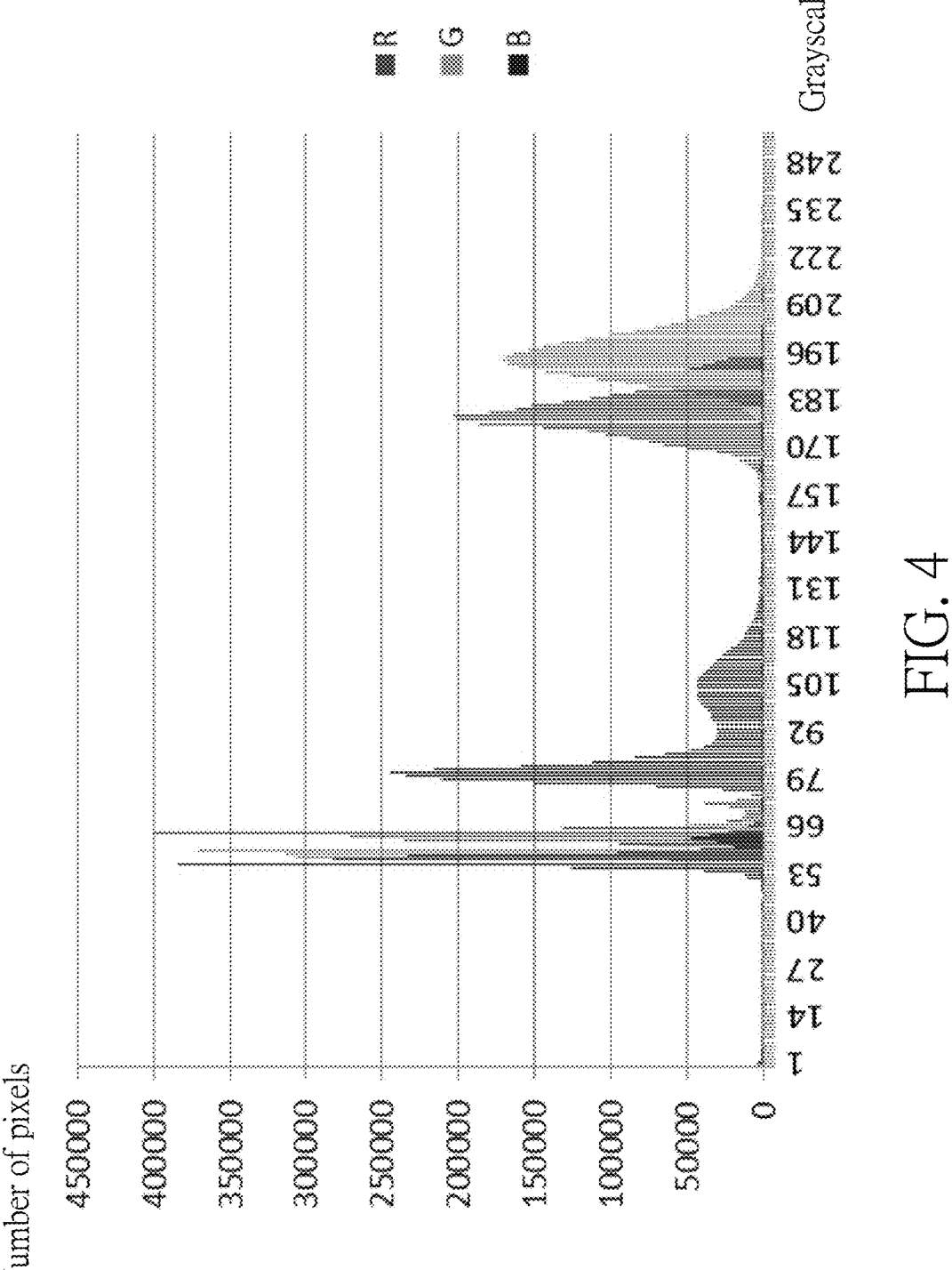
FIG. 4 is a diagram of grayscale distribution of RGB pixels of the bitmap data of the wafer of FIG. 2.

In step S306, the processor 20 can generate the grayscale distribution of RGB pixels according to the bitmap data. FIG. 4 is a diagram of grayscale distribution of RGB pixels of the bitmap data of the wafer 30. The grayscale distribution of RGB pixels is a histogram, which presents the total number of pixels with different brightness in the image. The horizontal axis represents the grayscale values, that is, the brightness of RGB colors. The vertical axis represents the number of pixels accumulated with the grayscale value. The region of the histogram with lower grayscale values represents darker pixels, and the region with higher grayscale values represents brighter pixels. The grayscale distribution in FIG. 4 can be generated according to the following equation:

$$h(k) = n_k$$

h(k) is a grayscale distribution function; $n_k$ is number of pixels with a grayscale value of k; and k is an integer between 0 and 255.

The grayscale distribution shown in FIG. 4 can be obtained by using the above equation to calculate RGB pixels of the bitmap data of the wafer 30. It can be seen from FIG. 4 that the majority of the red pixels have grayscale values of approximately 50 to 80 and 150 to 200; the majority of the green pixels have grayscale values of approximately 50 to 70 and 170 to 230; the majority of the blue pixels have grayscale values of approximately 50 to 130.

Figure 5:
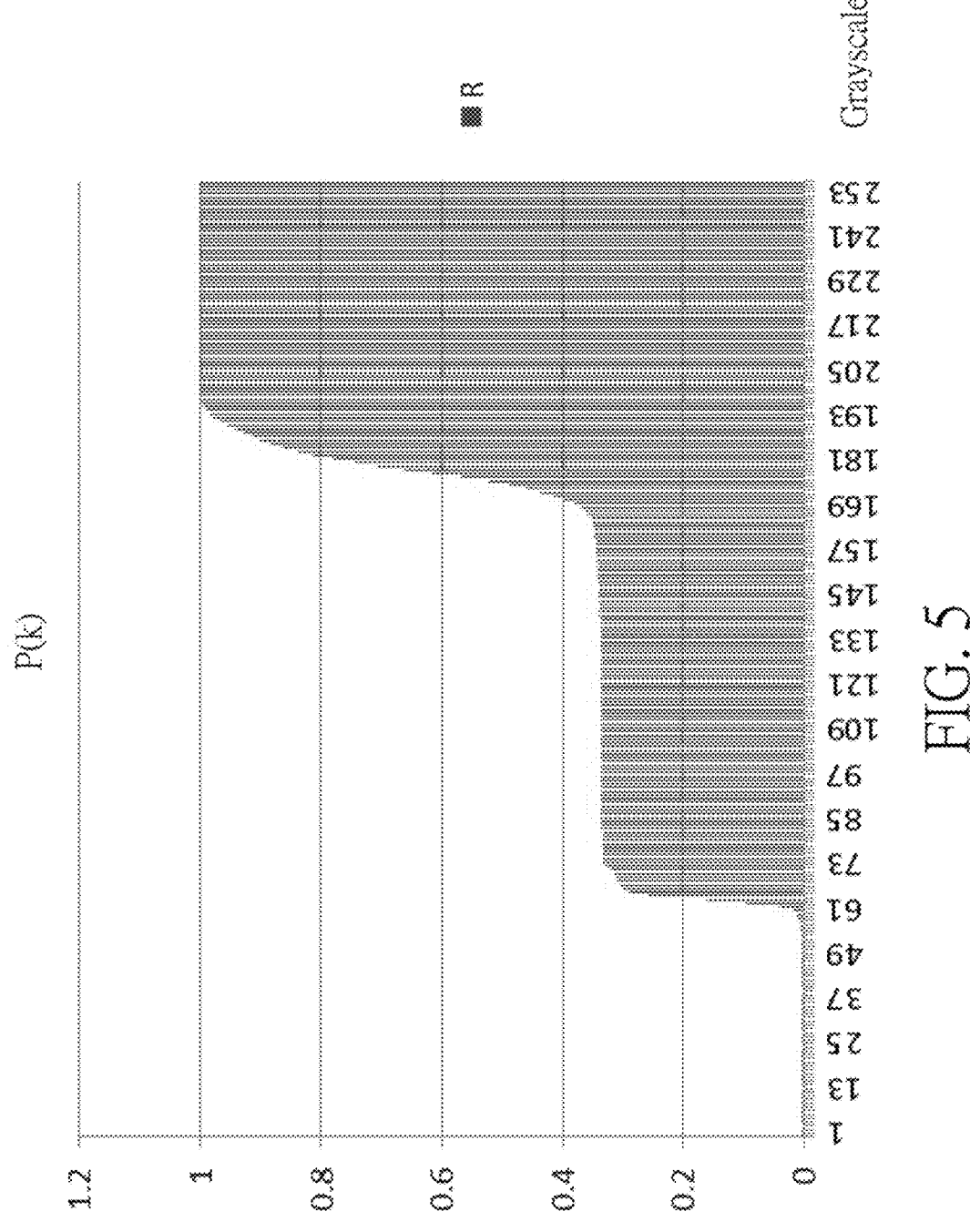
FIG. 5 illustrates the grayscale cumulative probability distribution of red pixels in the image of the wafer of FIG. 2.

In step S308, the processor 20 can generate the grayscale cumulative probability distribution of the RGB pixels according to the grayscale distribution shown in FIG. 4. The grayscale cumulative probability distribution can be regarded as the integral of the normalized grayscale distribution. Taking the red pixels as an example, FIG. 5 illustrates the grayscale cumulative probability distribution of the red pixels of the image of the wafer 30. The vertical axis represents the pixel cumulative probability, and the horizontal axis represents the grayscale values. The grayscale cumulative probability distribution for red pixels can be generated by the following equation:

$$P(k) = \sum_{i=0}^{k} \frac{n_i}{N}$$

P(k) is a grayscale cumulative probability distribution function. N is total number of pixels. $n_i$ is number of pixels with grayscale value of i.

The grayscale cumulative probability distribution of the red pixel of FIG. 5 can be obtained using the above equation according to the grayscale distribution of the red pixels in FIG. 4. The grayscale cumulative probability distribution of the green pixels and the blue pixels can be obtained in the same way using the above equation. The description is not repeated here for brevity.

Figure 6:
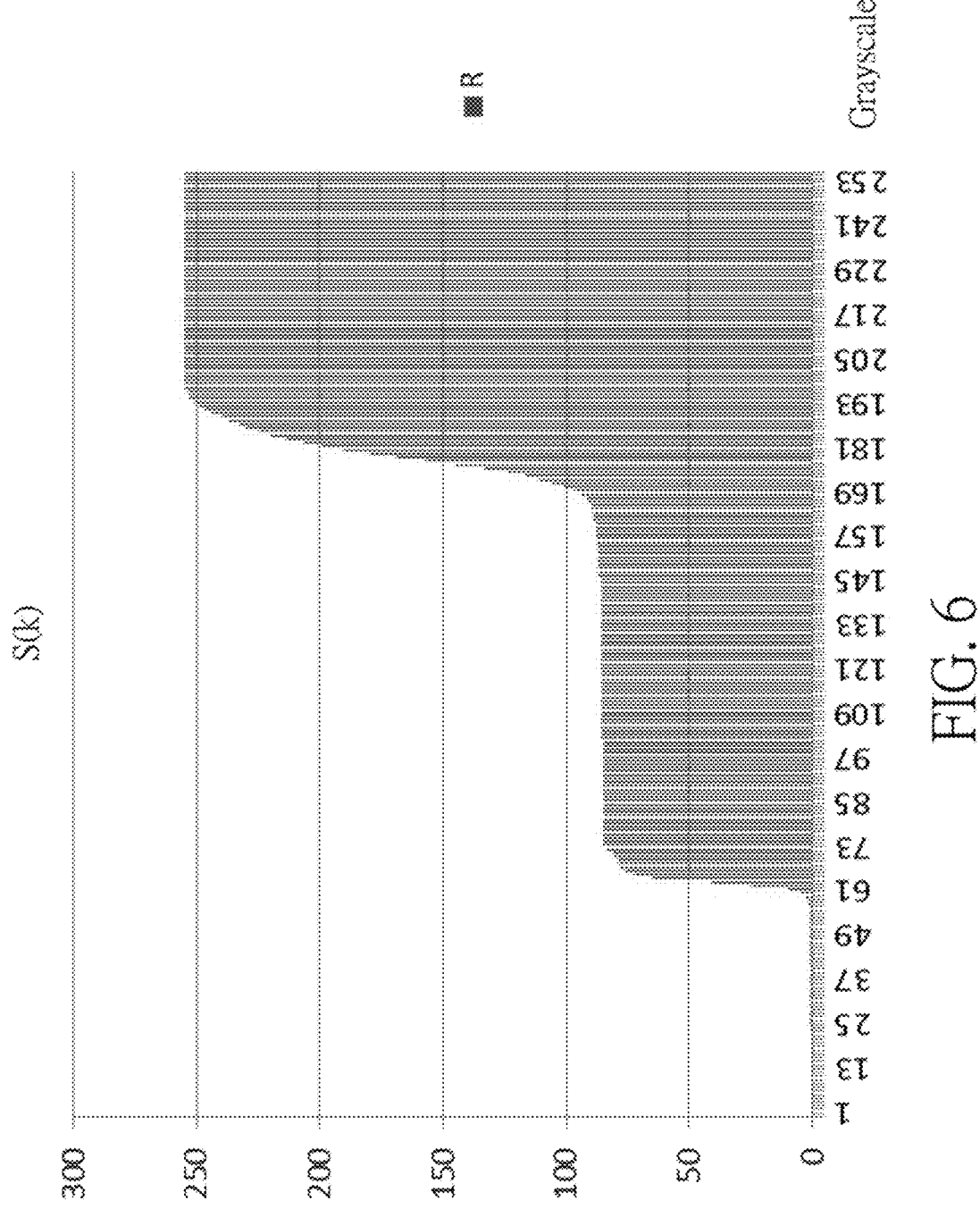
FIG. 6 illustrates the mapping function of the red pixel of the image of the wafer of FIG. 2.

After obtaining the grayscale cumulative probability distributions of the RGB pixels, the processor 20 generates the mapping function according to the grayscale cumulative probability distributions of the RGB pixels in step S310. Taking the red pixel as an example, FIG. 6 illustrates the mapping function of the red pixel of the image of the wafer 30 of FIG. 2. The mapping function for the red pixels can be generated by the following equation:

$$s(k) = P(k) \times 255$$

s(k) is the mapping function. k is an integer between 0 and 255. The mapping function s(k) is the grayscale cumulative probability distribution P(k) after adjustment of the bit depth of the red pixel. The mapping functions of the green pixels and the blue pixels can be obtained in the same way using the above equation. The mapping function can be used to equalize the grayscale distribution of the RGB pixels in FIG. 4 to produce an equalized grayscale distribution such that the defects of the wafer 30 can be made more obvious in the image.

Figure 7:
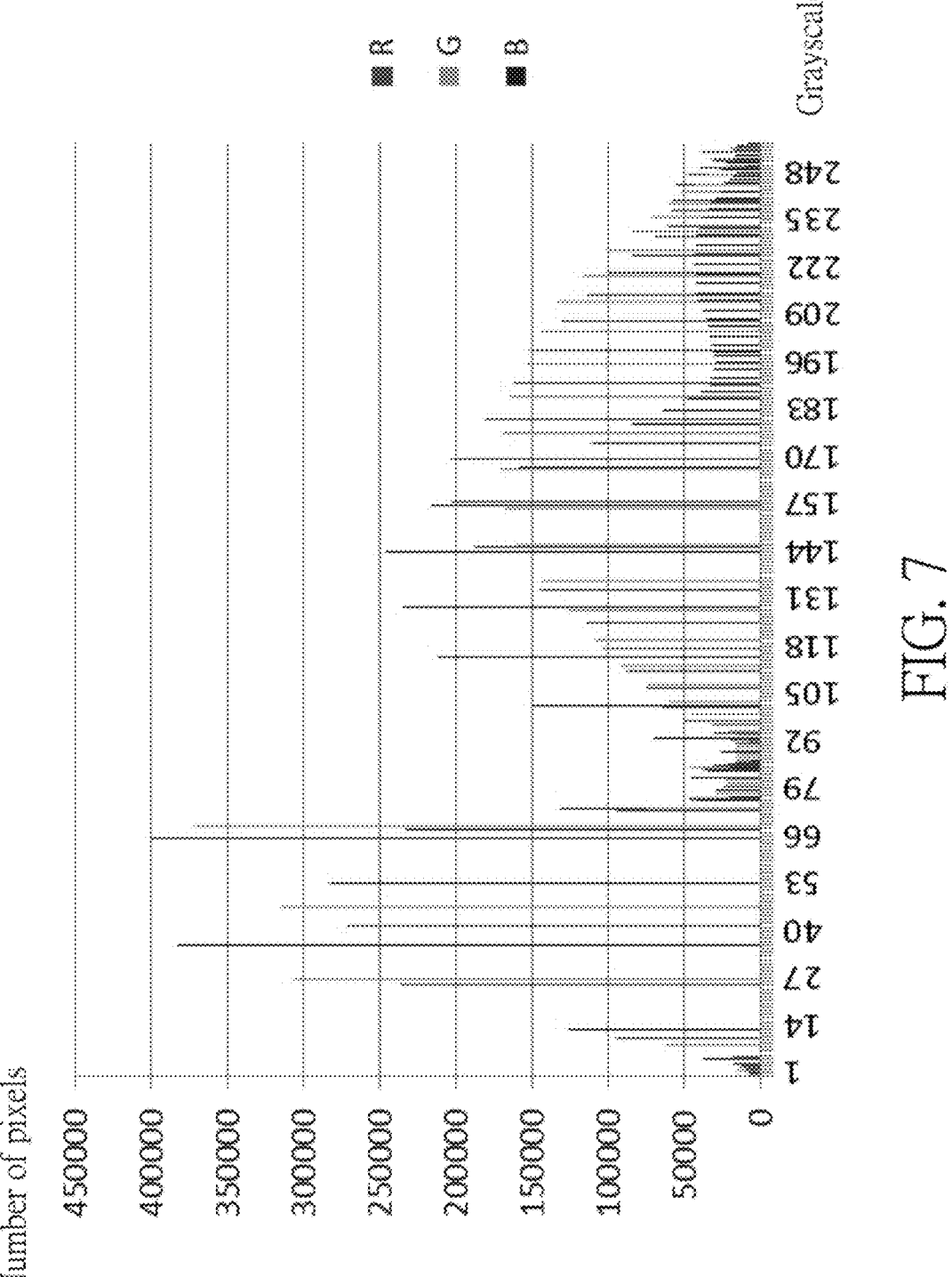
FIG. 7 is a diagram of equalized grayscale distribution of the RGB pixels of the image of the wafer of FIG. 2.

FIG. 7 is a diagram of equalized grayscale distribution of the RGB pixels of the image of the wafer 30 of FIG. 2. The horizontal axis represents a grayscale value, and the vertical axis represents the number of pixels. In step S312, the processor 20 converts the grayscale distribution of RGB pixels in FIG. 4 into the equalized grayscale distribution by the aforementioned mapping function. The grayscale distribution is transformed into the equalized grayscale distribution by the mapping function according to the following equation:

$$h_e(k) = s(k)$$

$h_e(k)$ is an equalized grayscale distribution function. s(k) is the mapping function, and k represents the grayscale value, ranging from 0 to 255.

By the above equation with the mapping function, the original grayscale is given a new value. For example, grayscale value 2 of the original image becomes grayscale value 3, and grayscale value 4 becomes grayscale value 5, and so on so forth. After the grayscale value of each pixel in the original image of the wafer 30 is updated, the histogram shown in FIG. 7 can be generated according to the equalized grayscale distribution function.

By plug-in the grayscale distributions of the red, green and blue pixels of the wafer 30 to the above-mentioned red pixel mapping function, green pixel mapping function and blue pixel mapping function the respectively, equalized grayscale distribution result shown in FIG. 7 can be obtained. The equalized grayscale distribution can make the defective parts of the wafer 30 more apparent, thus helping wafer engineers to quickly identify wafer defects.

Figure 8:
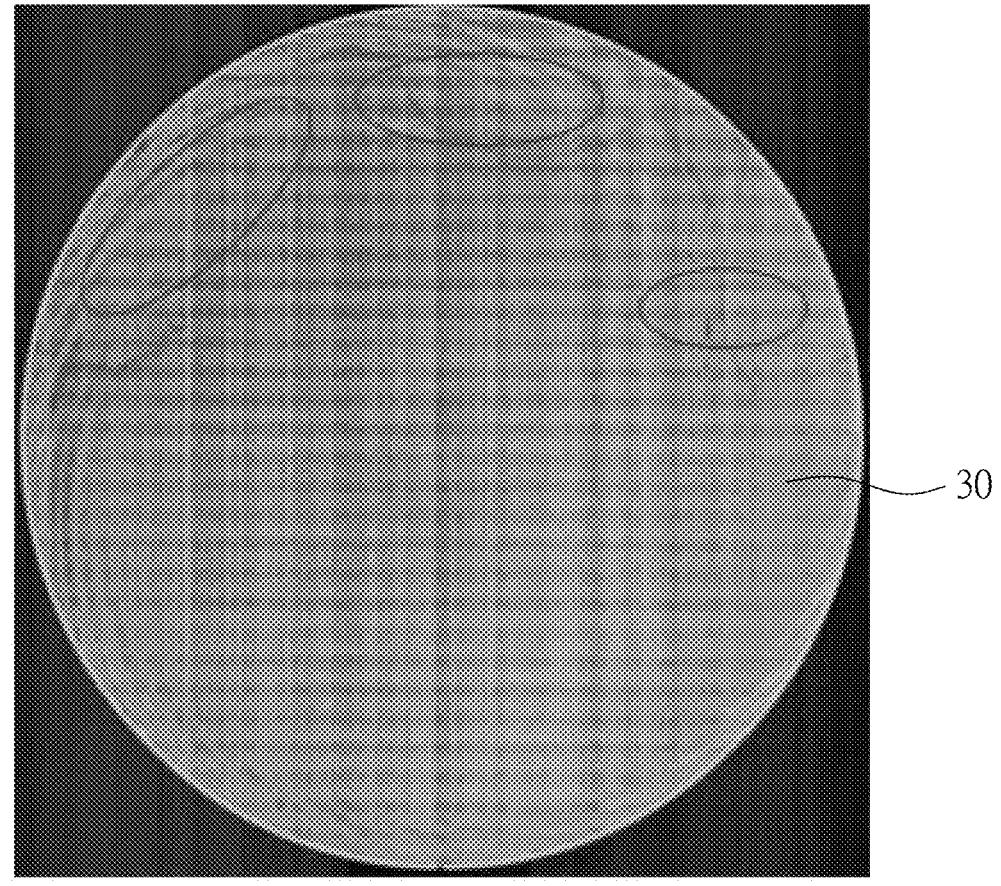
FIG. 8 is an equalized image of the wafer of FIG. 2.

FIG. 8 is an equalized image of the wafer 30 of FIG. 2. In step S314, the processor 20 can generate the equalized image of the wafer 30 according to the equalized grayscale distribution in FIG. 7. It can be seen from FIG. 8 that the place with the spiral pattern represent defects of the wafer 30. Compared with the circled portion in FIG. 2, the defect are more apparent in equalized wafer image in FIG. 8. By this way, wafer engineers can quickly identify wafer defects and move to the next step of the fabrication process.

In summary, the wafer image processing method provided by the embodiment can make defective portions of the wafer more apparent through the image processing techniques, thus helping engineers to quickly detect the wafer defects. Using the method described in this article, wafer engineers can quickly identify wafer defects, increase inspection productivity, and move to the next step of the process more rapidly, thereby saving time and labor cost.

Those skilled in the art will readily observe that numerous modifications and alterations of the device and method may be made while retaining the teachings of the invention. Accordingly, the above disclosure should be construed as limited only by the metes and bounds of the appended claims.

What is claimed is:

1. A method for wafer image equalization comprising:
obtaining a wafer image;
converting the wafer image into bitmap data comprising RGB pixels;
generating a corresponding grayscale distribution for each of a red component, a green component, and a blue component of the RGB pixels according to the bitmap data;
generating a corresponding grayscale cumulative probability distribution for each of the red component, the green component, and the blue component of the RGB pixels according to the corresponding grayscale distribution;
generating a corresponding mapping function according to the corresponding grayscale cumulative probability distribution for each of the red, green, and blue components of the RGB pixels;
converting the corresponding grayscale distribution for each of the red, green, and blue components of the RGB pixels into an equalized grayscale distribution for each of red, green, and blue components of the RGB pixels according to the corresponding mapping function; and generating an equalized wafer image according to the equalized grayscale distribution for each of the red, green, and blue components of the RGB pixels.

2. The method of claim 1, wherein the corresponding grayscale distribution for each of the red, green, and blue components of the RGB pixels is generated according to a following equation:

$$h(k) = n_k$$

wherein:
h(k) is a grayscale distribution function;
$n_k$ is number of pixels with a grayscale value of k; and
k is an integer between 0 and 255.

3. The method of claim 2, wherein the corresponding grayscale cumulative probability distribution for each of the red, green, and blue components of the RGB pixels is generated according to a following equation:

$$P(k) = \sum_{i=0}^{k} \frac{n_i}{N}$$

wherein:
P(k) is a grayscale cumulative probability distribution function;
N is total number of pixels; and
$n_i$ is number of pixels with grayscale value of i.

4. The method of claim 3, wherein the corresponding mapping function is generated according to a following equation:

$$s(k) = P(k) \times 255$$

wherein:
s(k) is the mapping function.

5. The method of claim 4, wherein converting the corresponding grayscale distribution for each of the red, green, and blue components of the RGB pixels into the equalized grayscale distribution of the RGB pixels according to the corresponding mapping function is according to a following equation:

$$h_e(k) = s(k)$$

wherein:
$h_e(k)$ is an equalized grayscale distribution function.

6. The method of claim 1, wherein obtaining the wafer image comprises:
using a wafer intelligent scanner to capture a raw wafer image; and
decoding the raw wafer image to generate the wafer image.

7. The method of claim 6, wherein obtaining the wafer image further comprises obtaining a height and a width of the raw wafer image.

8. The method of claim 1, wherein the bitmap data comprises a position of each of the RGB pixels.

9. A wafer image equalization apparatus comprising:

a wafer intelligent scanner for capturing a raw wafer image; and a processor coupled to the wafer intelligent scanner, configured to:

decode the raw wafer image to generate the wafer image;

convert the wafer image into bitmap data comprising RGB pixels;

generate a corresponding grayscale distribution for each of a red component, a green component, and a blue component of the RGB pixels according to the bitmap data;

generate a corresponding grayscale cumulative probability distribution for each of the red, green, and blue components of the RGB pixels according to the corresponding grayscale distribution;

generate a corresponding mapping function according to the corresponding grayscale cumulative probability distribution for each of the red, green, and blue components of the RGB pixels;

convert the corresponding grayscale distribution for each of the red, green, and blue components of the RGB pixels into an equalized grayscale distribution for each of the red, green, and blue components of the RGB pixels according to the corresponding mapping function; and generate an equalized wafer image according to the equalized grayscale distribution for each of the red, green, and blue components of the RGB pixels.

10. The wafer image equalization apparatus of claim 9, wherein the bitmap data comprises a position of each of the RGB pixels.

* * * * *